March 14, 1933. J. SLAVIK 1,901,336
MEASURING ARRANGEMENT FOR MEASUREMENT OF RATIO OF TRANSFORMATION
AND PHASE ANGLES OF VOLTAGE AND CURRENT TRANSFORMERS
Filed April 2, 1929 2 Sheets-Sheet 1

Patented Mar. 14, 1933

1,901,336

UNITED STATES PATENT OFFICE

JOSEF SLAVIK, OF BRUNN, CZECHOSLOVAKIA

MEASURING ARRANGEMENT FOR MEASUREMENT OF RATIO OF TRANSFORMATION AND PHASE ANGLES OF VOLTAGE AND CURRENT TRANSFORMERS

Application filed April 2, 1929, Serial No. 351,861, and in Czechoslovakia April 5, 1928.

My invention relates to a method and a device for calibrating instrument transformers, as for instance, potential transformers and current transformers.

Heretofore difficulties have arisen in connection with apparatus for accurately calibrating instrument transformers, the known devices being intricate, bulky and not easily portable.

One of the objects of my invention is to avoid these drawbacks and I accomplish this result by using a pair of two-system electrical meters.

According to my invention I actuate and drive two similar two-system meters by the cooperation of currents supplied from a standard instrument transformer and from the transformer to be calibrated with currents supplied from an auxiliary current source. For this purpose I connect one system of both meters to the secondary of the standard transformer and to the auxiliary current source, while connecting the three other systems of the meters to the secondary of the unknown transformer and to the same auxiliary source. I read both meters after a given, but arbitrary time and deduce from the readings the calibration values of the unknown transformer.

In order that my invention may be better understood, I will now describe it by exemplification and in relation to the accompanying drawings, reference being had to the letters and figures marked thereon, like numerals or letters referring to like parts in the various figures in which.

Figure 1:
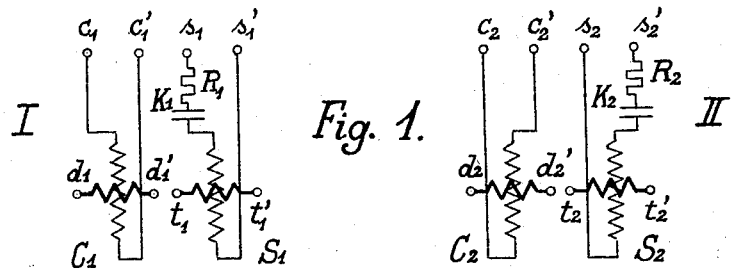
Figure 1 illustrates in a wiring diagram the driving circuits of a pair of two-system electric meters.

In the drawings I and II indicate a pair of two-system electric meters, the rotors of which permit fractions of one revolution to be read. Each meter includes two driving systems $C_1$, $S_1$ and $C_2$, $S_2$, respectively, and each of these driving systems comprises a voltage coil and a current coil. The meters are driven by the cooperation of currents flowing through the voltage coils with currents flowing through the current coils. Following the usual terminology I call "voltage circuits" the circuits which include voltage coils and "current circuits" those which include current coils. In the drawings the binding posts of the voltage circuits are designated by $c_1$, $c_1'$; $s_1$, $s_1'$; $c_2$, $c_2'$; and $s_2$, $s_2'$; respectively; while the binding posts of the current circuits or current coils are indicated at $d_1$, $d_1'$; $t_1$, $t_1'$; $d_2$, $d_2'$; and $t_2$, $t_2'$; respectively.

Electrical elements are inserted into the voltage circuits of the driving systems $S_1$ and $S_2$, consisting in each instance of condensers $K_1$ and $K_2$, and resistances $R_1$ and $R_2$ respectively. Preferably, these elements are so adjusted and dimensioned as to obtain a phase difference of 90° between the currents flowing through the voltage circuits of $S_1$ and $S_2$ and the currents flowing through the voltage circuits of $C_1$ and $C_2$ respectively. In a correctly adjusted meter, therefore equal torques are produced by each driving system when the currents flowing through the current coils of both systems are equal in magnitude and phase and the currents flowing through the voltage coils of both systems are equal in magnitude, but displaced in phase by 90°. Hence for sake of brevity one may call the driving systems $S_1$ and $S_2$ "reactive systems" or "sinus systems" and the driving systems $C_1$ and $C_2$ "active systems" or "cosinus systems," but it is to be understood that this is merely a brief mode of expression, in order to indicate the phase displacement between the currents flowing through the two voltage circuits of the meter.

Figure 2:
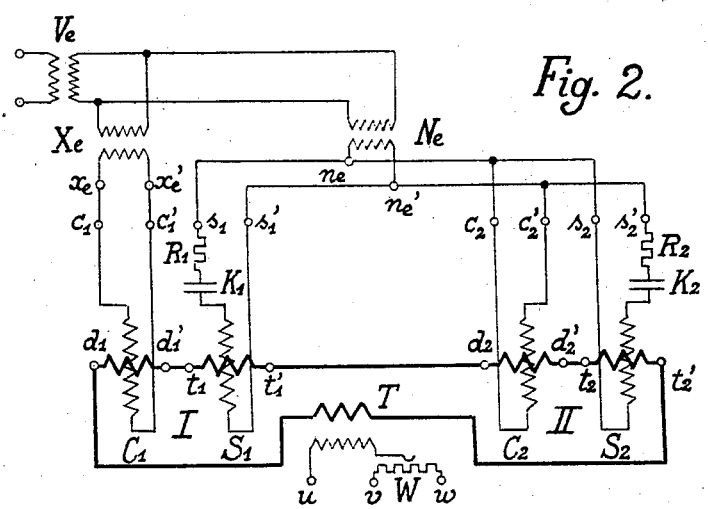
Figure 2 shows in a wiring diagram the electrical apparatus and connections for calibrating the ratios of potential transformers.
Figure 3:
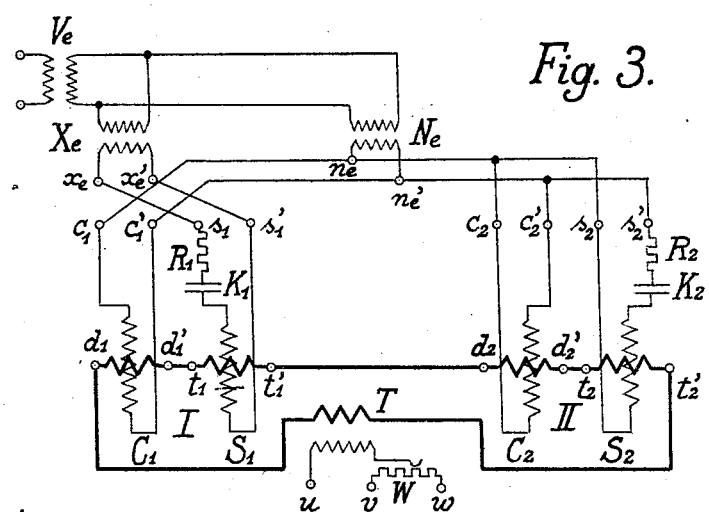
Figure 3 shows in a wiring diagram the electrical apparatus and connections for calibrating the phase angles of potential transformers.

In case of testing or calibrating potential transformers I connect all the current coils of both meters to an auxiliary current supply. In Figs. 2 and 3 this is effected by connecting all the current coils in series and feeding them with an auxiliary alternating current supplied from an auxiliary transformer T. The auxiliary current may be adjustable in phase and this can be obtained in any known manner, for instance (as shown in Figs. 2 and 3) by connecting one end of the primary of T to the terminal $u$ of a suitable three-phase supply and the other end of this primary by means of a sliding contact to a resistor W which connects the two remaining terminals $v$ and $w$ of the three-phase supply.

To calibrate an unknown potential transformer $X_e$ I avail myself of a standard potential transformer $N_e$ having known errors of ratio and phase angle and I connect the primaries of both transformers to a common voltage source represented in Figs. 2 and 3 by a supply transformer $V_e$. The secondaries of both transformers (designated by their terminals $x_e$, $x_e'$ and $n_e$, $n_e'$) are to be connected to the voltage circuits of the meters I and II, the special mode of connecting depending on the physical nature of the value to be tested.

Fig. 2 shows the connections for calibrating the ratio of potential transformers. The voltage circuit of the driving system $C_1$ is connected to the secondary of the unknown transformer $X_e$. The voltage circuits of the three other driving systems $S_1$, $C_2$ and $S_2$ are connected in parallel and to the secondary of the standard transformer $N_e$. The current coils of the four driving systems are in series with one another and the phase of the auxiliary current flowing through this series connection has so to be adjusted that the meter I would not run in case of the voltage circuit of the system $C_1$ being open or interrupted. As only the driving system $S_1$ is operative, if the voltage circuit of $C_1$ is open, one may also say that the auxiliary current should so be adjusted as to be in phase with the secondary voltage of the standard transformer $N_e$.

The meters I and II, after having been connected to both transformers and to the auxiliary current supply in the manner described, are actuated and driven by the co-operation of the currents flowing through their voltage coils with the currents flowing through their current coils. In carrying out the desired calibration, I read both meters after a given time; in other words, I note within a given time the number of revolutions of each meter (which number may also be a fraction). Suppose the numbers of revolutions of the meters I and II, read within a given time, are $n_1$ and $n_2$, respectively, and the secondary voltages of the transformers $N_e$ and $X_e$ are $E_n$ and $E_x$, respectively. As $$n_1 : n_2 = E_x : E_n, \quad (1)$$

the unknown voltage $E_x$ and, hence, the unknown ratio of the transformer $X_e$ may easily be calculated from this formula, since $E_n$ is a known value. The time to which the readings refer does not appear in the formula and it follows therefrom that this time may have any desired value and may freely be chosen.

Fig. 3 shows the connections for calibrating the phase angle of potential transformers. The voltage circuit of the driving system $S_1$ is connected to the secondary of the unknown transformer $X_e$, while the voltage circuits of the three other systems $S_2$, $C_1$ and $C_2$ are connected in parallel and to the secondary of the standard transformer $N_e$. The connections and supply of the current coils and the adjustment of the auxiliary current are the same as in the case of calibrating the ratio.

In carrying out the calibration of phase angles, I proceed in a similar manner as described in connection with the calibrating of ratios. Accordingly, I read both meters after a given time ($t$) and I deduce from the readings the unknown calibration values. Suppose, again, the numbers of revolutions of the meters be $n_1$ and $n_2$, the secondary voltages of the transformers $E_n$ and $E_x$, $I_h$ the value of the auxiliary current flowing through the current coils, $t$ the time of measurement, $\gamma$ the phase angle, and $k$ the so called system constant of the driving systems of the meters. In the meter I the system $C_1$ produces a torque which is in proportion to $E_n$ and the system $S_1$ produces a torque which is in proportion to $E_x$ and to the sine of the angle between $E_n$ and $E_x$. In the meter II only the system $C_2$ produces a torque and this torque is in proportion to $E_n$. The system $S_2$ does not produce a torque, because $E_n$ is in phase with $I_h$. Hence, the following formulæ may be derived:

$$n_1 = t\ k\ E_n I_h \pm t\ k\ E_x I_h \sin \gamma \quad (2)$$
$$n_2 = t\ k\ E_n I_h \pm 0 \quad (3)$$

Since $E_n$ is approximately equal to $E_x$ and, likewise, $\sin \gamma$ to $\tan \gamma$, one may replace formula (2) by $$n_1 = t\ k\ E_n I_h [1 \pm \tan \gamma] \quad (2a)$$

and obtain the final formula $$\tan \gamma = (n_1 - n_2) : n_2 \quad (4).$$

From formula (4) the phase angle may easily be deduced. Again, the time of measurement ($t$) does not materially influence the result obtained.

Figure 4:
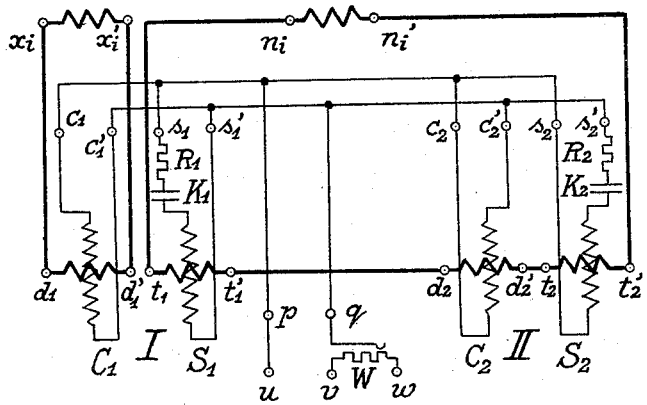
Figure 4 shows in a wiring diagram the electrical apparatus and connections for calibrating the ratios of current transformers.
Figure 5:
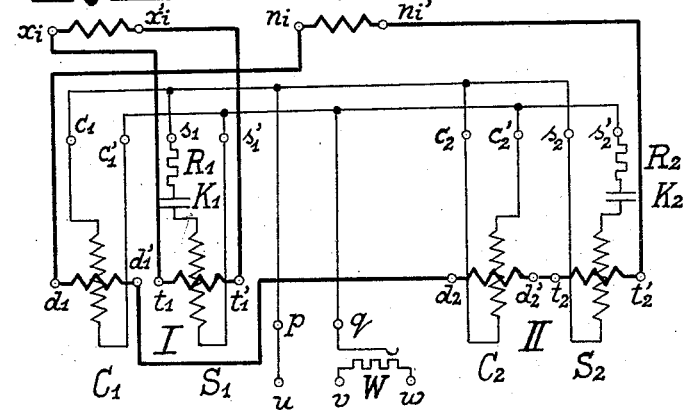
Figure 5 shows in a wiring diagram the electrical apparatus and connections for calibrating the phase angles of current transformers.

Figs. 4 and 5 show the connections for calibrating current transformers. For this purpose the unknown transformer $X_i$ will be compared with a known standard current transformer $N_i$, the primaries of both transformers being connected to a common current supply represented in the figures by transformer $V_i$. The secondaries of the transformers $X_i$ and $N_i$ (designated by their terminals $x_i$, $x_i'$ and $n_i$, $n_i'$ respectively) are to be connected to the current coils of the meters I and II in a manner depending on the physical nature of the value to be measured.

All the voltage coils or voltage circuits of both meters are connected to an auxiliary voltage supply. In Figs. 4 and 5 this is obtained by connecting the voltage circuits in parallel and to a single-phase voltage supply represented in the figures by the terminals $p$ and $q$. This auxiliary voltage may be adjustable in phase, for instance, (as shown in Figs. 4 and 5) by connecting $p$ to the terminal $u$ of a suitable three-phase supply and $q$ by means of a sliding contact to a resistor $W$ which connects the terminals $v$ and $w$ of the three-phase supply.

If it is desired to calibrate the ratio of the unknown current transformer $X_i$, the current coil of the driving system $C_1$ is connected to the secondary of $X_i$, while the current coils of the three other systems $S_1$, $C_2$ and $S_2$ are connected in series to one another and to the secondary of $N_i$, as shown in Fig. 4.

If it is desired to calibrate the phase angle of $X_i$, the current coil of the system $S_1$ is connected to the secondary of $X_i$ while the current coils of the three other systems $S_2$, $C_1$ and $C_2$ are connected in series to one another and to the secondary of $N_i$, as shown in Fig. 5.

The operation of a calibrating device according to Figs. 4 and 5 is similar to that described in connection with Figs. 2 and 3 with the only differences that the transformer voltages are replaced by transformer currents and the auxiliary current by an auxiliary voltage. It seems, therefore, sufficient to remark that also the calibrations of current transformers are carried out by reading both meters (which are connected in the manner described) after a given time and deducing the desired values from the readings.

In general, it is of use to repeat each measurement or reading with interchanged meters and to take the mean value of both readings, in order to eliminate errors of measurement due to any inaccurate adjustment of the meter constants. For interchanging the meters any known switching-over device may be employed.

Figure 6:
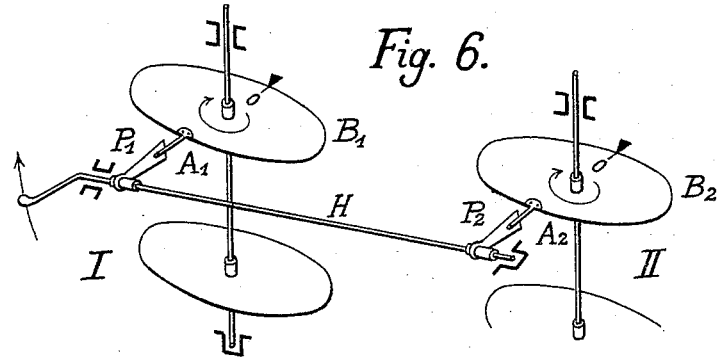
Figure 6 shows a common locking device for two meters.

As the calibrating method according to my invention requires only a comparison between energies passed through two meters within a given space of time, the beginning of this space of time, i. e. the beginning of measurement may be chosen at any convenient time after the meters have started. In most cases, however, it is advantageous to begin the measurement at the starting moment of the meters and accordingly to start both meters simultaneously. Any known means adapted to simultaneously start or set free both meters may be used for this purpose. Preferably, a common starting device for both meters may be provided for. Fig. 6 illustrates by way of example a common locking device for both meters. The driving discs or brake discs $B_1$ and $B_2$ of the two meters are provided with stops $A_1$ and $A_2$, respectively. By rotating the shaft H arms $P_1$ and $P_2$ mounted thereon can be brought into or out of engagement with the stops $A_1$ and $A_2$, whereby the discs are stopped or released simultaneously. Of course, any other known type of locking device may be used instead of that shown in Fig. 6.

It may be observed that it is not absolutely necessary to so adjust the driving systems of either meter as to obtain in one system torques which are in proportion to the active power $E\ I \cos \varphi$ and in the other system torques which are in proportion to the reactive power $E\ I \sin \varphi$. The adjustment of the meter is also correct, if the torques of the systems correspond to $E\ I \cos (\varphi+\alpha)$ and $E\ I \sin (\varphi+\alpha)$, respectively, because $$E\ I \cos (\varphi+\alpha) = \pm E\ I \sin [(\varphi+\alpha) \pm 90°].$$

Though any value of the phase angle $\alpha$ may be chosen, the adjusting of the systems becomes more easy, if $\alpha=0$.

It is obvious that the aforementioned conditions for meters adjusted according to my invention may be described by different wordings though the adjustment is the same. One may define the condition, for instance, as follows: In the correctly adjusted meter the two driving systems produce equal torques when the currents flowing through one pair of corresponding driving coils of both systems (say through the voltage coils) are equal in magnitude and phase and the currents flowing through the other pair of corresponding driving coils of both systems (say through the current coils) are equal in magnitude, but displaced in phase by 90°.

From this it will be understood that there are several ways for accomplishing the desired adjustment of the meters. If the two-system meter is intended for calibrating potential transformers, one may require that equal torques should be produced by each system when the same current is passed through the current coils and the voltages applied to the voltage circuits are equal in magnitude, but displaced in phase by 90°. Likewise, if the meter is intended for calibrating current transformers, equal torques should be produced when the same voltage is applied to the voltage circuits and the currents flowing through the current coils are equal in magnitude, but displaced in phase by 90°. While I have shown, by way of example, resistances and condensers as means for adjusting the driving circuits, it is to be understood that any other appropriate means known for such purposes may be substituted therefor.

By using calibrating devices according to my invention a high degree of accuracy in measuring instrument transformers is obtained. The measurements can be carried out even with a fluctuating line voltage and meanwhile the meters are allowed to run with full speed even if phase angles are calibrated. The calibrating devices are portable and permit the measurements to be executed out of a laboratory and during the service of the transformer. A further advantage of my novel device is that only a single tester or observer is required for all the measurements.

I claim:

1. In a device for calibrating instrument transformers, the combination with two similar electric meters each including two drivings systems, of an unknown transformer to be calibrated, a standard instrument transformer, an auxiliary current source, one driving system of said meters being connected to the secondary of the said unknown transformer and to the said auxiliary current source, while the three other driving systems of the meters are connected to the secondary of the said standard transformer and to the said auxiliary current source, and means whereby both meters are simultaneously driven by the cooperation of currents supplied from the said secondaries with currents supplied from the said auxiliary source, to compare the electrical energy passed through the meters within a given time and to deduce therefrom the calibration values of the unknown transformer.

2. In a device for calibrating instrument transformers, the combination with an unknown transformer to be calibrated, a standard instrument transformer and an auxiliary current source, of two similar two-system electric meters each system thereof having two cooperative driving coils, one driving coil of one system of said meters being connected to the secondary of the unknown transformer and the corresponding driving coils of the three other systems being connected to the secondary of the said standard transfomer, while all the other driving coils of both meters are connected to the said auxiliary current source and means whereby both meters are driven by the cooperation of currents supplied from the said auxiliary source, to compare the electrical energy passed through the meters within a given time and to deduce therefrom the calibration values of the unknown transformer.

3. In a device for calibrating instrument transformers, the combination with an unknown transformer to be calibrated, a standard instrument transformer and an auxiliary current source, of two similar two-system electric meters each system thereof having two cooperative driving coils each of said meters being so adjusted as to have equal torques produced by each system of the meter when the currents flowing through one pair of corresponding driving coils of both systems are equal in magnitude and phase and the currents flowing through the other pair of corresponding driving coils of both systems are equal in magnitude, but displaced in phase by 90°, one driving coil of one system of both meters being connected to the secondary of the unknown transformer and the corresponding driving coils of the three other systems being connected to the secondary of the said standard transformer, while all the other driving coils of both meters are connected to an auxiliary current source, and means whereby both meters are simultaneously driven by the cooperation of currents supplied from the said secondaries with cursents supplied from the said auxiliary source, to compare the electrical energy passed through the meters within a given time and to deduce therefrom the calibration values of the unknown transformer.

4. In a device for calibrating voltage transformers, the combination with an unknown voltage transformer to be calibrated, a standard potential transformer and an auxiliary current source, of two similar two-system electric meters each system thereof including a voltage coil and a current coil, each of said meters being so adjusted as to have equal torques produced by each system of the meter when the currents flowing through the voltage coils of both systems are equal in magnitude and phase and the currents flowing through the current coils of both systems are equal in magnitude but displaced in phase by 90°, the voltage coil of one system of the said meters being connected to the secondary of the unknown transformer and the voltage coils of the three other systems being connected to the secondary of the said standard transformer, while all the current coils of both meters are connected to the said auxiliary current source, and means whereby both meters are simultaneously driven by the cooperation of currents supplied from the said auxiliary current source with currents supplied from the said secondaries, to compare the electrical energy passed through the meters within a given time and to deduce therefrom the calibration values of the unknown transformer.

5. In a device for calibrating current transformers, the combination with an unknown current transformer to be tested, a standard current transformer and an auxiliary voltage supply, of two similar two-system electric meters, each system thereof including a voltage coil and a current coil, each of said meters being so adjusted as to have equal torques produced by each system of the meter when the currents flowing through the voltage coils of both systems are equal in magnitude and phase and the currents flowing through the current coils of both systems are equal in magnitude but displaced in phase by 90°, the current coil of one system of the said meters being connected to the secondary of the unknown transformer and the current coils of the three other systems being connected in series and to the secondary of the said standard transformer while all the voltage coils of both meters are connected to the said auxiliary voltage supply, and means whereby both meters are simultaneously driven by the cooperation of currents supplied from the said auxiliary voltage supply with currents supplied from the said secondaries, to compare the electrical energy passed through the meters within a given time and to deduce therefrom the calibration values of the transformer to be tested.

6. A calibrating device for instrument transformers comprising two similar two-system electric meters having one system arranged for connection with an auxiliary current source and an unknown transformer and the three other systems for connection with an auxiliary current source and a standard transformer, so as to be driven by the cooperation of currents supplied from the said transformers with currents supplied from the said auxiliary source, and means for simultaneously actuating both meters by the said cooperation of currents, to compare the electrical energy passed through the meters within a given time and to deduce therefrom the calibration values of the unknown transformer.

7. A calibrating device for voltage transformers comprising a pair of two-system electric meters; two driving systems in each of said meters; an actuating voltage circuit in each driving system, one of the said voltage circuits being adapted to be connected to an unknown transformer while the three other voltage circuits are adapted to be connected to a standard potential transformer; an actuating current circuit in each driving system, including a current coil adapted to be supplied from an auxiliary current source; and means for simultaneously actuating both meters by the cooperation of currents supplied from the said transformers with currents supplied from the said auxiliary current source, to compare the electrical energy passed through the meters within a given time and to deduce therefrom the calibration values of the unknown transformer.

8. A calibrating device for voltage transformers comprising a pair of two-system electric meters; two driving systems in each of said meters; an actuating voltage circuit in each driving system, one of the said voltage circuits being adapted to be connected to an unknown transformer while the three other voltage circuits are adapted to be connected to a standard potential transformer; electrical elements in at least one voltage circuit, said elements permitting to adjust the current flowing through said voltage circuit; and an actuating current circuit in each driving system, including a current coil, all the current coils being connected in series and adapted to be supplied by an auxiliary current, to simultaneously actuate both meters by the cooperation of said auxiliary current with currents supplied from the said transformers, to compare thereafter the electrical energy passed through the meters within a given time and to deduce therefrom the calibration values of the unknown transformer.

9. A calibrating device for current transformers comprising a pair of two-system electric meters; two driving systems in each of said meters; an actuating current circuit in each driving system, one of the said current circuits being adapted to be connected to an unknown transformer while the three other current circuits are adapted to be connected to a standard current transformer; an actuating voltage circuit in each driving system, each of said voltage circuits being adapted to be connected to an auxiliary voltage supply; and means for simultaneously actuating both meters by the cooperation of currents supplied from the said transformers with currents supplied from the said auxiliary voltage supply, to compare the electrical energy passed through the meters within a given time and to deduce therefrom the calibration values of the unknown transformer.

10. A calibrating device for current transformers comprising a pair of two-system electric meters; two driving systems in each of said meters; an actuating voltage circuit in each driving system, said voltage circuits being connected in parallel with one another and adapted to be connected to a common auxiliary voltage supply; electrical elements in at least one voltage circuit, said elements permitting to adjust the current flowing through said voltage circuit; and an actuating current circuit in each driving system, one of the said current circuits being adapted to be connected to an unknown transformer while the three other current circuits are adapted to be connected to a standard current transformer; to simultaneously actuate both meters by the cooperation of currents supplied from the said transformers with currents supplied from the said auxiliary voltage supply, to compare thereafter the electrical energy passed through the meters within a given time and to deduce therefrom the calibration values of the transformer to be tested.

11. In a calibrating device according to claim 7 the combination with an auxiliary current supply adapted to be connected up with the said current coils of both meters.

12. In a calibrating device according to claim 8 the combination with an auxiliary current supply being adjustable in phase and adapted to be connected up with the said current coils of both meters.

13. In a calibrating device according to claim 9 the combination with an auxiliary voltage supply adapted to be connected up with the said voltage circuits of both meters.

14. In a calibrating device according to claim 10 the combination with an auxiliary voltage supply being adjustable in phase and adapted to be connected up with the said voltage circuits of both meters.

15. In a calibrating device as set forth in claim 6, means to simultaneously start both meters.

16. In a calibrating device as set forth in claim 6, a common starting device for both meters.

17. In a calibrating device as set forth in claim 7, a common starting device for both meters.

18. In a calibrating device as set forth in claim 9 a common starting device for both meters.

In testimony whereof I affix my signature.

JOSEF SLAVIK.